March 22, 1938.  W. J. COOPER  2,112,069
RULER
Filed Aug. 8, 1933  2 Sheets-Sheet 1

INVENTOR
Woodson J. Cooper
BY
ATTORNEYS

March 22, 1938.　　　W. J. COOPER　　　2,112,069
RULER
Filed Aug. 8, 1933　　　2 Sheets-Sheet 2
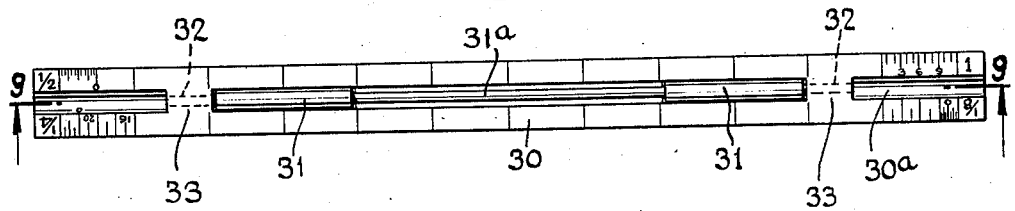
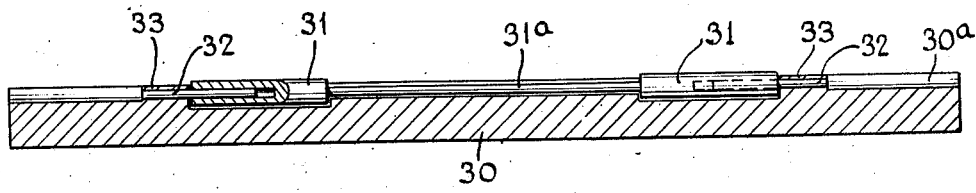
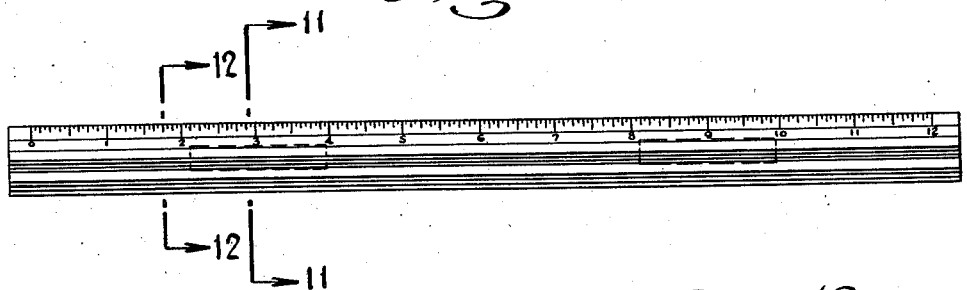
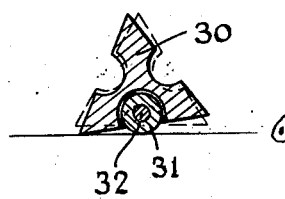
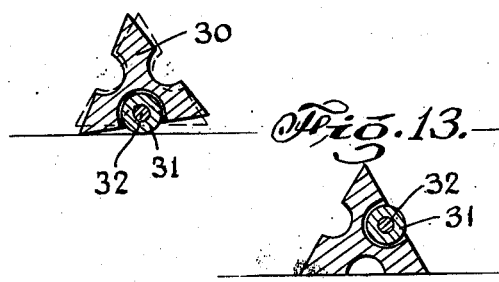
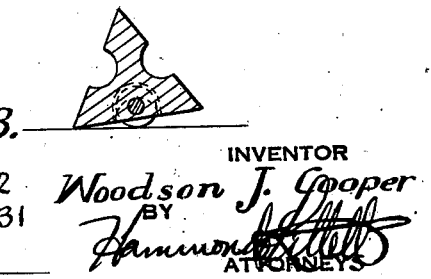
INVENTOR
Woodson J. Cooper
BY
ATTORNEYS Patented Mar. 22, 1938

2,112,069

UNITED STATES PATENT OFFICE 2,112,069

RULER

Woodson J. Cooper, Winslow, Ind.

Application August 8, 1933, Serial No. 684,143

3 Claims. (Cl. 33—109)

This invention relates to improvements in rulers and more particularly to the simplified manufacture of the class commonly used in schoolrooms, offices, etc., such as the short wooden type.

One of the principal objects of my invention is to provide a ruler of the short desk type with a pair of rollers normally inoperative but which may be brought into operative position so that the ruler may be used for drawing guide lines of parallel nature and for other geometric patterns as well as for measuring on flat surfaces.

Another object of my invention is to provide an improved roller construction for rulers which includes a plurality of thin small disks integrally joined by a common shaft and moveable into position so that the ruler may be rolled in parallel planes if desired or if a flat non-moveable rule is desired, the rollers can be folded and the rule used in the usual manner.

Another object of my invention is to provide an improved straight edge for a ruler of the wood type in which the straight edge is more securely anchored in position and cannot be loosened in service.

Another object of my invention is to provide an improved scale for a measuring ruler in which the scale is provided with perforations corresponding to the indicia and distance marks in the nature of a stencil and the ruler is provided with a suitable colored background which shows through the indices for better and more permanent definition of the measuring points.

Further objects and advantages of my invention will appear from the following description thereof taken in connection with the attached drawings which illustrate a preferred form of embodiment of my invention and in which.

Figure 1:
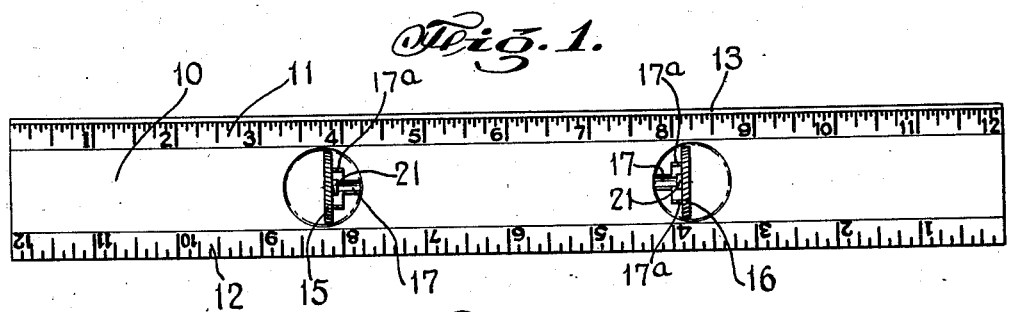
Figure 1 is a top plan view of one form of my improved ruler showing the rollers in operative position.
Figure 2:
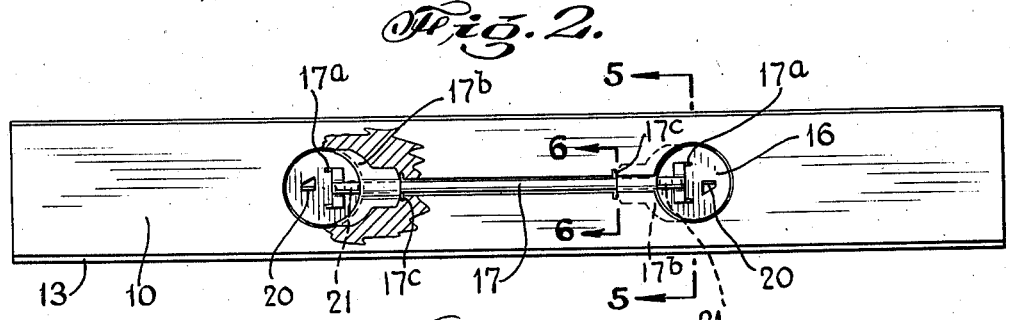
Figure 2 is a bottom plan view of the ruler shown in Figure 1 with the rollers in inoperative or closed position.
Figures 4, 5, 6:
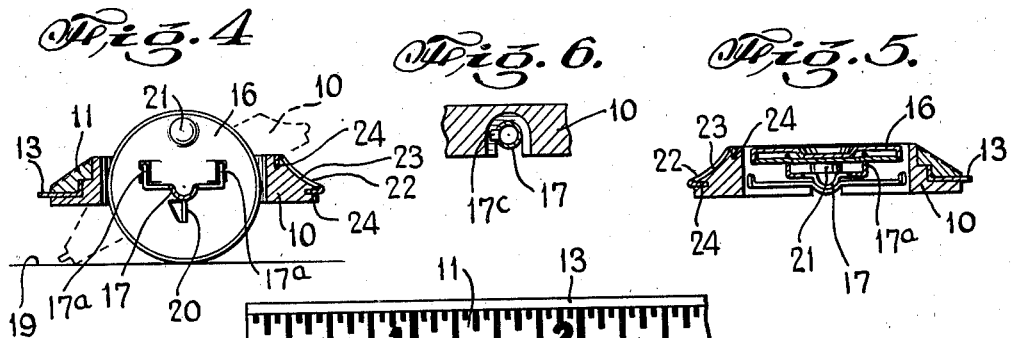
Figure 4 is a transverse vertical section taken substantially on the line 4—4 of Figure 3 and showing in dotted lines the position of the ruler when in rolling position.
Figure 7:
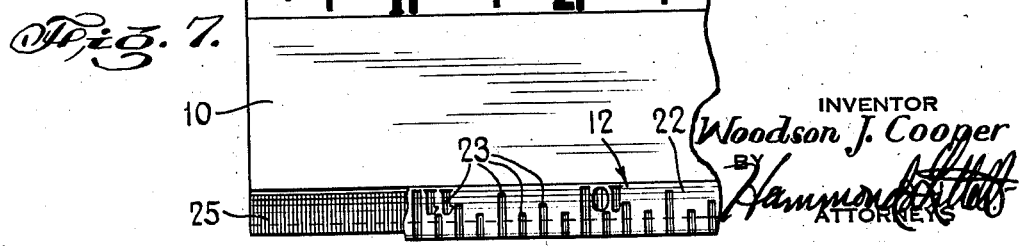

Figures 5 and 6 are detail transverse vertical sections taken substantially on the line 5—5 and 6—6 of Figure 2;

Figure 7 is a partial top plan view with parts broken away showing the details of the scale construction;

Figure 8 is a side elevation of a modified form of triangular rule with the rollers exposed;

Figure 9 is a horizontal and central section substantially on the line 9—9 of Figure 8;

Figure 10 is a side elevation similar to Figure 8 but of a different side of the scale;

Figures 11 and 12 are vertical sections taken substantially on the lines 11—11 and 12—12 of Figure 10, and, Figure 13 is a vertical section similar to Figure 11 showing the scale on a different edge.

Flat rulers of the inexpensive wooden type are commonly used in schoolrooms, offices, etc., for measuring and ruling purposes, but they are limited in use due to the inability to move the ruler in definite parallel positions. On the other hand, roller type guides commonly used for drawing parallel lines are so expensive due to the costly rollers that they are not as common and they are not suitable for flat measuring as they cannot be held stationary.

In one form to which the invention is susceptible the ruler 10 is preferably of the flat wood type usually of twelve inch length which may have a plurality of scales 11 and 12 reading in opposite directions. It is provided with a straight edge 13 which will hereinafter be described in greater detail. It has the usual flat top and bottom and is similar in many respects to the usual ruler.

Figure 3:
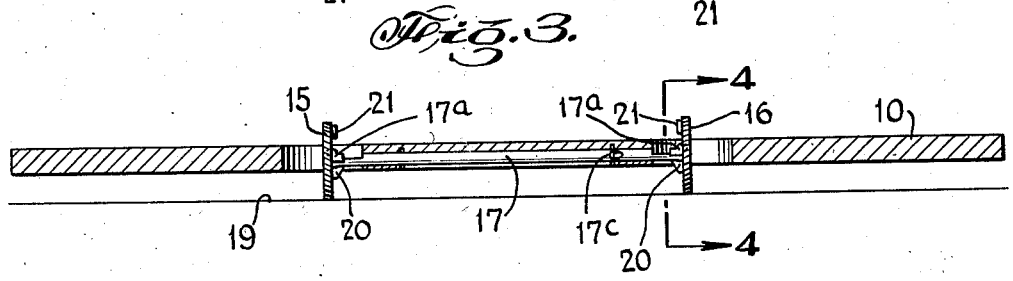
Figure 3 is a central vertical section of the ruler with the rollers in operative position.

As one of the features of my invention, however, the ruler 10 is provided with a plurality of pivoted disks 15 and 16 which are joined by a common shaft 17 as will appear from the bottom view in Figure 2. These disks are of a thickness less than the thickness of the ruler but of a diameter greater than the thickness of the ruler 10 and as shown in Figure 3, when in the open position the rollers or disks extend below the bottom of the ruler 10 to contact with the surface 19 on which the ruler is used. By means of the common shaft 17, the rollers being of the same size and contacting with spaced points on the flat surface 19 and rolling together due to the common shaft, will necessarily move the ruler in parallel planes.

The ruler may be titled as shown in dotted lines in Figure 4 so that the edge of the ruler will contact with the plane 19 so that the desired parallel guide lines may be drawn. The size of the roller may be determined to suit general conditions so that the amount of tilting of the ruler for drawing guide lines can be increased or decreased. The roller disk 16 as shown in Figure 4 is exaggerated in diameter with respect to the size of the ruler 10, but it definitely shows the operation of the disk. It is of course to be understood that it is not necessary to tilt the ruler to draw parallel lines and in inking, it may be found undesirable to do so. In such case the ruler is easily held in horizontal position by light finger pressure on the top.

The shaft 17 is provided with a fork end 17a to which the disks are respectively pivoted. Each disk is provided with a plurality of slots 16a, one edge of which has a projection which extends into a suitable hole in the fork 17a as shown in Figure 4. Each disk is also provided with a catch 20 and a catch 21, the catch 21 holding the disk in the closed or inoperative position, said catch 21 engaging the fork 17a and the catch 20 engaging the shaft 17 as shown in Figure 4 to hold the disk in open position. The disks are relatively thin as shown in Figure 5 and readily fold up within the confines of the ruler 10. The manner of pivoting the disk is also shown in Figure 5, and it will be understood that by merely depressing one edge of the disk with the finger that the disk may be moved to the open position as desired.

The entire apparatus is inserted in the bottom of the ruler in a suitable slot or channel into which the shaft 17 and guides or bearings 17b are inserted. The shaft is provided with a suitable projection 17c which works in a suitable groove in the ruler 10 as shown in Figure 6 to prevent longitudinal movement of the shaft with respect to the ruler.

In order to more securely fasten the straight edge 13, I prefer to make the straight edge of L shape as more particularly shown in Figures 4 and 5 and inserting the upstanding angle of the straight edge within the ruler and then suitably cementing the one scale 11 to the body of the ruler. This prevents the straight edge 13 from coming out after hard use or weakening of the usual friction joint. The precise angular shape of the straight edge which is usually brass may be varied and it may be inserted in a different fashion but the angle as shown is particularly satisfactory and the manner of fastening has proved economical.

Another feature of my invention more particularly shown in Figure 7 includes the use of one scale 22 which is of stencil form and apertured at the indices 23 representing the different distance marks along the scale. This scale is secured to the ruler by appropriate inwardly flanged ends 24 as shown in Figure 4 and the ruler 10 underneath the scale is colored in a suitable manner as shown at 25 so that when the scale is in place the colored background will show through the indicia 23. This materially improves the reading of the scale and is more permanent as the paint is not exposed. Both scales may be similarly made if so desired. As the stencil scale is also of metal and projects beyond the edge of the ruler, it may also be used as a straight edge for ruling purposes and as it is secured by the inward flanges, it cannot be pulled out during use.

The improved ruler is principally adaptable to schoolrooms and for general office use where an inexpensive and effective ruler is desired. It makes possible the ready ruling of parallel lines or other geometric shapes and may be used on blackboards as well as on the desk. The rollers are preferably grooved although for blackboard use it may be found that a rubber edge formed by adding a rubber band may be preferable. The ruler is, of course, equally suitable for use both as a measure as well as a guide device and is so constructed that it will withstand considerable hard wear and may be used in connection with pencil, pen, crayon or other marking devices.

A modified form of structure is shown in Figures 8 to 13 inclusive in which the ruler 30 is of the triangular shape and similar to the type commonly used by engineers and known as the engineer's scale. It is not necessary from the standpoint of this invention to have the elaborate scale markings but it is to be observed that the roller mechanism may equally as well be applied to such a form of ruler.

The rollers 31 in this instance are tubular and may be integrally joined by the common shaft 31a which will insure their rolling together. The rollers may be placed in the usual finger groove 30a in the ruler by merely enlarging the depth the desired amount at the roller point. A suitable pin 32 extending through the bearing point 33 and into the roller ends will retain the rollers in place. This construction is more clearly shown in Figure 9 and involves the minimum of drilling or other labor in manufacture. Other methods may be used but this is probably the most economical.

The operation of the ruler is demonstrated in Figures 11, 12 and 13. If the usual flat ruling is desired, the roller which extends out one side only, may be turned out of position where it will not interfere with measuring, ruling or other normal functions of the scale. If, on the other hand, it is desired to use the rollers for parallel line ruling it is merely necessary to turn the ruler to the position in Figures 11 and 12. In this position the roller contact makes possible any desired parallel movement of the ruler and any geometric patterns or other marking which can be made by any roller guide can be accomplished by this device. It may be tilted and held in a tilted position for ink ruling or it may be moved into edge contact for more precise marking or measuring. If desired it may be equipped with a straight edge of the type shown in Figure 4 and other changes may be made in size, shape or scale marking which do not change the relation of the rollers always in fixed position but moveable into inoperative position.

While I have shown preferred forms of embodiment of my invention I am aware that other modifications may be made thereto and I therefore desire a broad interpretation of my invention within the scope and spirit of the description herein and of the claims appended hereinafter.

I claim:

1. A triangular rule of the class described having a plurality of finger grips, a plurality of rollers, a common shaft for said rollers, and means to mount said rollers and shaft in one of said finger grips.

2. A triangular rule of the class described having a plurality of finger grips, a plurality of rollers, a common shaft for said rollers, and means to mount said rollers and shaft in one of said finger grips, said means including a plurality of pins extending into said rollers and through a bearing on said body portion.

3. A ruling device comprising a body portion having a cross section generally triangular in outline, at least one flat side, cut out portions in at least one other side to provide finger grips, and roller means extending partially outside the outline of the said body portion from a flat side and supporting the same at longitudinally spaced points when the device rests on such side, the remaining portions of said roller means lying within the outline of said body portion.

WOODSON J. COOPER.